US011873037B2

(12) United States Patent
Washnock

(10) Patent No.: US 11,873,037 B2
(45) Date of Patent: Jan. 16, 2024

(54) BELT DRIVEN ROTARY ASSIST APPARATUS FOR RECIRCULATING BALL STEERING GEARS

(71) Applicant: Ford Global Technologies, LLC, Dearborn, MI (US)

(72) Inventor: Joseph Washnock, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 17/192,703

(22) Filed: Mar. 4, 2021

(65) Prior Publication Data

US 2022/0281516 A1    Sep. 8, 2022

(51) Int. Cl.
*B62D 5/04*    (2006.01)

(52) U.S. Cl.
CPC ......... *B62D 5/0454* (2013.01); *B62D 5/0421* (2013.01); *B62D 5/0448* (2013.01); *B62D 5/0481* (2013.01)

(58) Field of Classification Search
CPC .. B62D 5/0421; B62D 5/0448; B62D 5/0454; B62D 5/0481
USPC .............................................. 74/388 PS, 640
See application file for complete search history.

(56) References Cited

U.S. PATENT DOCUMENTS

| | | | |
|---|---|---|---|
| 3,868,888 A | 3/1975 | Rehfeld | |
| 3,893,528 A | 7/1975 | Rehfeld | |
| 5,267,625 A | 12/1993 | Shimizu | |
| 5,341,701 A | 8/1994 | Krom | |
| 6,810,985 B1 | 11/2004 | Budaker | |
| 8,360,197 B2 | 1/2013 | Escobedo | |
| 8,567,554 B2 | 10/2013 | Zaloga et al. | |
| 9,346,490 B2 | 5/2016 | Washnock et al. | |
| 9,975,573 B2 | 5/2018 | She | |

(Continued)

FOREIGN PATENT DOCUMENTS

| | | | |
|---|---|---|---|
| CN | 203946160 | | 11/2014 |
| CN | 107176203 | * | 9/2017 |

(Continued)

OTHER PUBLICATIONS

United States Patent and Trademark Office, "Non-Final Office Action," issued in connection with U.S. Appl. No. 17/087,557, dated Dec. 7, 2022, 10 pages.

(Continued)

*Primary Examiner* — William C Joyce
(74) *Attorney, Agent, or Firm* — Lorne Forsythe; Hanley Flight & Zimmerman LLC

(57) ABSTRACT

Belt driven rotary assist apparatus for recirculating ball steering gears are disclosed. An example motor vehicle steering system includes an input shaft to couple to a steering shaft of a motor vehicle, a worm gear, a first end of the worm gear coupled to the input shaft, a second end of the worm gear fixed to a helical spur gear, a ball nut surrounding a portion of the worm gear, the ball nut including ball bearings and ball guides, a first pulley wheel fixed to a pinion, the first pulley wheel engaged with a belt, the pinion engaged with the helical spur gear, a motor fixed to a second pulley wheel, the second pulley wheel engaged with the belt, the motor to rotate the worm gear to translate the ball nut, and a sector gear engaged with the ball nut, the sector gear to rotate as the ball nut translates.

20 Claims, 7 Drawing Sheets

(56) References Cited

U.S. PATENT DOCUMENTS

| | | |
|---|---|---|
| 10,421,481 B2 | 9/2019 | Wilske |
| 11,345,396 B2 | 5/2022 | Cartwright |
| 2007/0083326 A1 | 4/2007 | Jo et al. |
| 2007/0089926 A1 | 4/2007 | Jo et al. |
| 2012/0241243 A1* | 9/2012 | Zaloga .................... B62D 3/08 |
| | | 180/444 |
| 2012/0241244 A1 | 9/2012 | Escobedo |
| 2013/0032430 A1 | 2/2013 | Zaloga |
| 2014/0157922 A1 | 6/2014 | Schneider |
| 2014/0311263 A1 | 10/2014 | Washnock |
| 2015/0101436 A1 | 4/2015 | Washnock |
| 2018/0022381 A1 | 1/2018 | Matsumura |
| 2018/0111643 A1 | 4/2018 | Kim |
| 2018/0244305 A1 | 8/2018 | Cai |
| 2019/0065173 A1 | 2/2019 | Xi et al. |
| 2019/0351932 A1 | 11/2019 | Washnock |
| 2020/0017138 A1 | 1/2020 | Kirchweger |
| 2021/0038766 A1 | 2/2021 | Chen et al. |
| 2021/0261188 A1 | 8/2021 | Ko |
| 2021/0387666 A1 | 12/2021 | Hulten |
| 2021/0403077 A1 | 12/2021 | Kogan |
| 2022/0032991 A1 | 2/2022 | Pattok |
| 2022/0135118 A1 | 5/2022 | Kadam |
| 2022/0204072 A1 | 6/2022 | Boyle |
| 2022/0281516 A1 | 9/2022 | Washnock |

FOREIGN PATENT DOCUMENTS

| | | |
|---|---|---|
| CN | 107140010 | 2/2019 |
| CN | 209225235 | 8/2019 |
| EP | 2450257 A1 | 5/2012 |
| JP | 2004-338553 | * 12/2004 |
| WO | 2020089208 | 5/2020 |

OTHER PUBLICATIONS

United States Patent and Trademark Office, "Final Office Action," issued in connection with U.S. Appl. No. 17/087,557, dated May 4, 2023, 13 pages.

* cited by examiner

BELT DRIVEN ROTARY ASSIST APPARATUS FOR RECIRCULATING BALL STEERING GEARS

FIELD OF THE DISCLOSURE

This disclosure relates generally to steering systems and, more particularly, to a belt to gear rotary assist apparatus for recirculating ball steering gears.

BACKGROUND

Known vehicles typically include a mechanical linkage that connects front wheels of a vehicle to a steering wheel, which allows a driver to adjust the orientation of the front wheels by rotating the steering wheel. For example, many known steering systems include rack and pinion gears that translate rotational motion of a steering wheel to linear actuation or movement of a drag link and/or tie rods connected to the front wheels. As the steering wheel rotates, the drag link and/or the tie rods change the angular orientation of the wheels and steer the vehicle.

In recent years, trucks have utilized hydraulic assist recirculating ball (RCB) steering systems. The hydraulic assist of the RCB steering systems is provided by a pump that transports hydraulic steering fluid to the RCB system. In some implementations, electronic torque overlay mechanisms are utilized to provide an electric steering feel to the hydraulic system.

SUMMARY

Example belt driven rotary assist apparatus for recirculating ball steering gears are disclosed herein. An example motor vehicle steering system includes an input shaft to couple to a steering shaft of a motor vehicle, a worm gear, a first end of the worm gear coupled to the input shaft, a second end of the worm gear fixed to a helical spur gear, a ball nut surrounding a portion of the worm gear, the ball nut including ball bearings and ball guides, a first pulley wheel fixed to a pinion, the first pulley wheel engaged with a belt, the pinion engaged with the helical spur gear, a motor fixed to a second pulley wheel, the second pulley wheel engaged with the belt, the motor to rotate the worm gear to translate the ball nut, and a sector gear engaged with the ball nut, the sector gear to rotate as the ball nut translates.

An example steering actuator includes a worm gear fixed to a helical spur gear, a pulley set including a belt engaged with a shaft of a motor and a pulley wheel, a first gear set including a pinion of the pulley wheel engaged with the helical spur gear, and a second gear set including a ball nut engaged with a portion of the worm gear, the ball nut to translate as the worm gear rotates.

An example steering apparatus includes a worm gear fixed to a helical spur gear, the worm gear and the helical spur gear aligned along a first axis of rotation, a belt engaged with a pulley wheel, the pulley wheel fixed to a first pinion, the pulley wheel and the first pinion aligned along a second axis of rotation parallel to the first axis of rotation, the first pinion engaged with the helical spur gear, and a motor fixed to a shaft, the motor and the shaft aligned along a third axis of rotation parallel to the second axis of rotation, the second pinion engaged with the belt.

Figure 1:
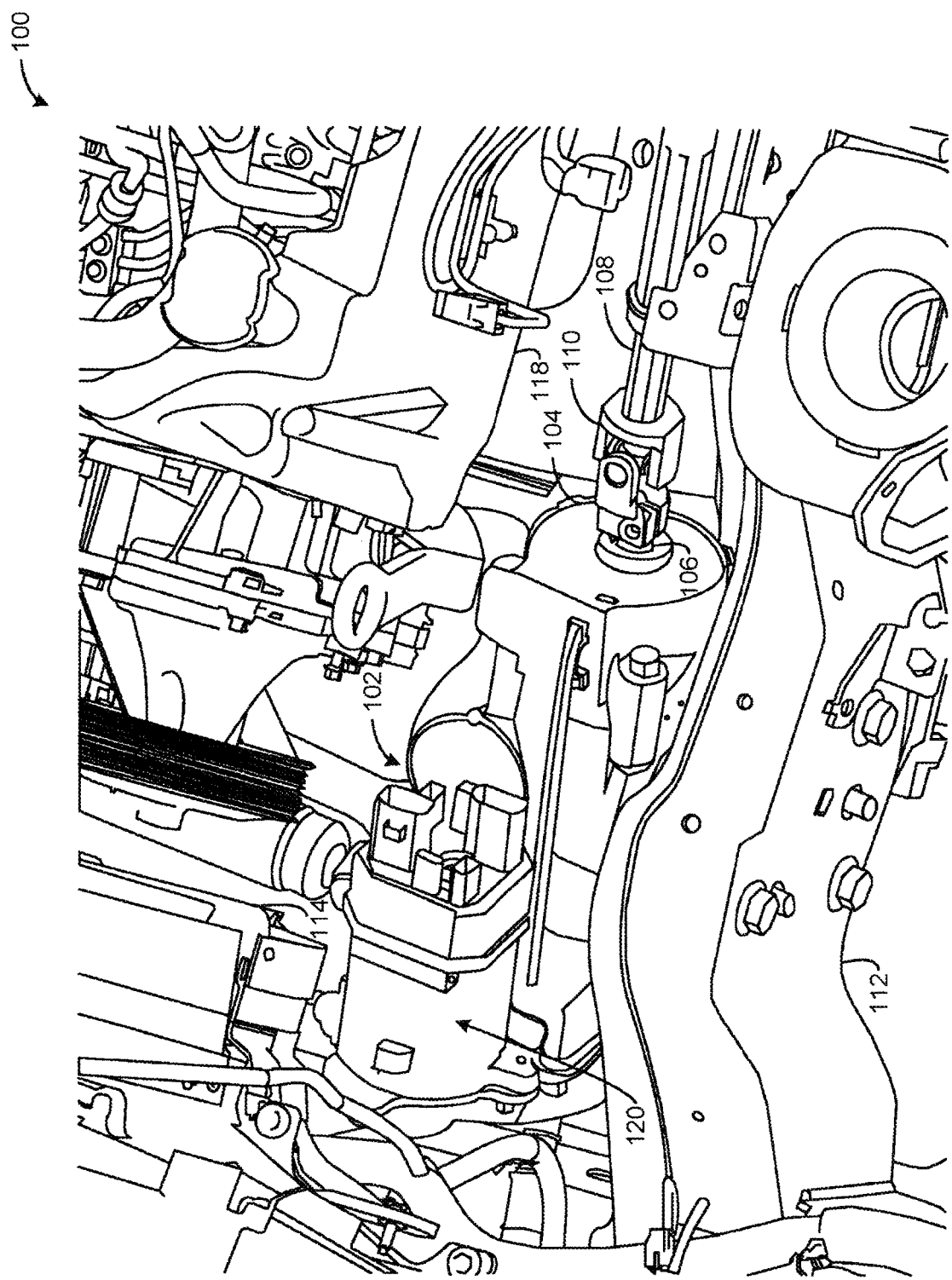
FIG. 1 illustrates a first view of a steering system in an under-hood environment of a vehicle.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example electrically powered belt driven rotary assist mechanisms for recirculating ball (RCB) steering gear systems. Traditionally, some heavy-duty trucks have utilized a steering mechanism including hydraulically assisted RCB gears or worm and wheel steering gears. In some instances, a pump provides the hydraulic assist to the RCB gears by pumping hydraulic steering fluid through the steering system. In some such instances, as the steering wheel is turned, a steering shaft rotates to cause a piston of the RCB gears to move linearly. In turn, the piston rotates a sector that is coupled to a pitman arm that turns the wheels. The hydraulic steering fluid is pumped to assist the movement of the piston based on the rotation of the steering shaft. However, hydraulic assist RCB gears lack precision in steering feel compared to electrically powered steering. Further, continuous pumping of a hydraulic pump causes a parasitic engine power loss and, thus, reduces an efficiency of the engine.

Known electrically powered steering systems utilize an electrically powered motor instead of the hydraulic pump and the associated piston to move a ball nut. However, the electrically powered steering systems often lack power compared to the hydraulic assist steering. As such, heavier vehicles, such as trucks and/or buses, typically utilize hydraulic assist steering.

Examples disclosed herein provide belt driven rotary assist apparatus for RCB steering gears. The example belt driven rotary assist apparatus generate sufficient power for relatively heavy vehicles such as trucks to utilize electrically powered steering systems. Although the rotary assist apparatus for RCB steering systems generate enough power to steer trucks, it should be understood that examples disclosed herein may be implemented in any other steerable vehicle.

An example steering system (e.g., a steering actuator) disclosed herein includes an input shaft coupled to a steering shaft of a motor vehicle. In some examples, a driver rotates the input shaft by turning a steering wheel operatively coupled to the steering shaft. In some examples, the input shaft is coupled to a first end of a worm gear while a second end of the worm gear is fixed to a helical spur gear. In some such examples, the worm gear and the helical spur gear are aligned along a first axis of rotation. In some examples, a first pulley wheel is fixed to a pinion, which is engaged with the helical spur gear. In some examples, the pinion is engaged with internal gear teeth of the helical spur gear. In some examples, the pinion is engaged with external gear teeth of the helical spur gear. In some examples, the first pulley wheel is engaged with a belt. In some examples, the pulley wheel and the first pinion are aligned along a second axis of rotation.

The steering system further includes a ball nut surrounding a portion of the worm gear. The ball nut includes ball bearings and ball guides to convert a rotation of the worm gear into a translation of the ball nut. In some examples, a sector gear, that is engaged with the ball nut, rotates as the ball nut translates. In some examples, a motor is fixed to a second pulley wheel (e.g., a shaft) that is engaged with the belt. In such examples, the motor and the second pinion are aligned along a third axis of rotation.

In some examples, a placement of the second axis of rotation and the third axis of rotation is orbital relative to the first axis of rotation. Specifically, the first pulley wheel, the pinion, the motor, and the second pulley wheel can be positioned anywhere along a 360° orbit of the worm gear given that the pinion is engaged with the helical spur gear and the first and second pulley wheels are engaged with the belt.

In some examples, the second pulley wheel rotates the belt to cause the first pulley wheel and the associated pinion to rotate. Further, the pinion rotates the helical spur gear and, thus, the worm gear. As such, the rotation of the worm gear causes the ball nut to translate, which rotates the sector gear. In some examples, a first end of a pitman arm is coupled to the sector gear and a second end of the pitman arm is operatively coupled to a drag link and, in turn, one or more tie rods. As a result, the pitman arm converts the rotation of the sector gear to a movement of the drag link and the tie rod(s) to turn wheels of the motor vehicle. For example, the drag link and/or the tie rods are coupled to knuckles of the front wheels allowing the drag link and/or the tie rods to adjust the orientation of the front wheels as the pitman arm is moved by the sector gear.

In some examples, a first end of a torsion bar is coupled to an interior of the input shaft and a second end of the torsion bar is coupled to an interior of the worm gear. In some examples, a torque sensor measures an angular rotation of the input shaft relative to the worm gear via a magnet mounted on the input shaft and/or the torsion bar. Further, the torque sensor converts the angular rotation to a torque applied by the input shaft to the torsion bar. In turn, an output of the motor is based on the torque applied by the input shaft to the torsion bar and/or the angular rotation of the magnet.

In some examples, an engagement of the belt with the first pulley wheel and the second pulley wheel provides a first gear reduction. In addition, an engagement between the pinion and the helical spur gear provides a second gear reduction. As a result, the first gear reduction and the second gear reduction provide a combined reduction of greater than 100:1. Although examples disclosed herein may provide a gear reduction of greater than 100:1, the gear reduction may range anywhere from 1:1 to greater than 100:1.

In some examples, a pulley set includes the belt engaged with the shaft of the motor and the first pulley wheel along a first plane. In some examples, a first gear set includes the pinion of the pulley wheel engaged with the helical spur gear along a second plane. Further, the pinion of the pulley wheel (e.g., the first pulley wheel) can be positioned anywhere within the second plane provided that the pinion of the pulley wheel is engaged with the helical spur gear and the belt is engaged with the pulley wheel and the shaft of the motor. In some examples, a second gear set includes the ball nut engaged with a portion of the worm gear. In some examples, the first plane and the second plane are orthogonal to an axis of rotation of the worm gear (e.g., the first axis of rotation). In some examples, the first plane does not intersect the worm gear.

FIG. 1 illustrates a first view of a steering system (e.g., a steering apparatus, a steering actuator) 102 in an under-hood environment 100 of a vehicle. In FIG. 1, the steering system 102 is positioned within a housing 104. In some examples, the housing 104 includes one or more housings that are coupled to protect the steering system 102, as discussed further in association with FIG. 3. In some examples, an input shaft 106 of the steering system 102 protrudes from the housing 104. In some examples, the input shaft 106 couples to a steering shaft 108 via a connection 110. In some examples, the steering shaft 108 is operatively coupled to a steering wheel of the vehicle. As a result, the input shaft 106 rotates with the steering shaft 108 as a driver rotates the steering wheel. In turn, the steering system 102 converts the rotation of the steering wheel to a rotation of the wheels of the vehicle to steer the vehicle.

In FIG. 1, the steering system 102 is positioned in the under-hood environment 100 between a frame 112 and a fan 114 of the vehicle. Typically, vehicles include the fan 114 to pass air through a radiator and maintain an operating temperature of an engine 118 of the vehicle. Accordingly, the fan 114, the radiator, and the engine 118 consume a significant amount of the space in the under-hood environment 100. Advantageously, stacked gears and a position of a motor 120 of the steering system 102 enables the steering system 102 to be positioned within relatively small spaces in the under-hood environment 100 while still generating enough power to turn the wheels of heavy trucks. Specifically, the stacked gears provide a combined reduction of greater than 100:1 to generate ample force to turn the wheels.

In some examples, the position of the motor 120 of the steering system 102 is adaptable to the available space of the under-hood environment 100. For example, the motor 120 can be positioned anywhere within a 360° orbit of a worm gear of the steering system 102 given that a belt is engaged with a shaft of the motor and a pulley wheel and a pinion of the pulley wheel is engaged with a helical spur gear that is fixed to the worm gear.

Figure 2:
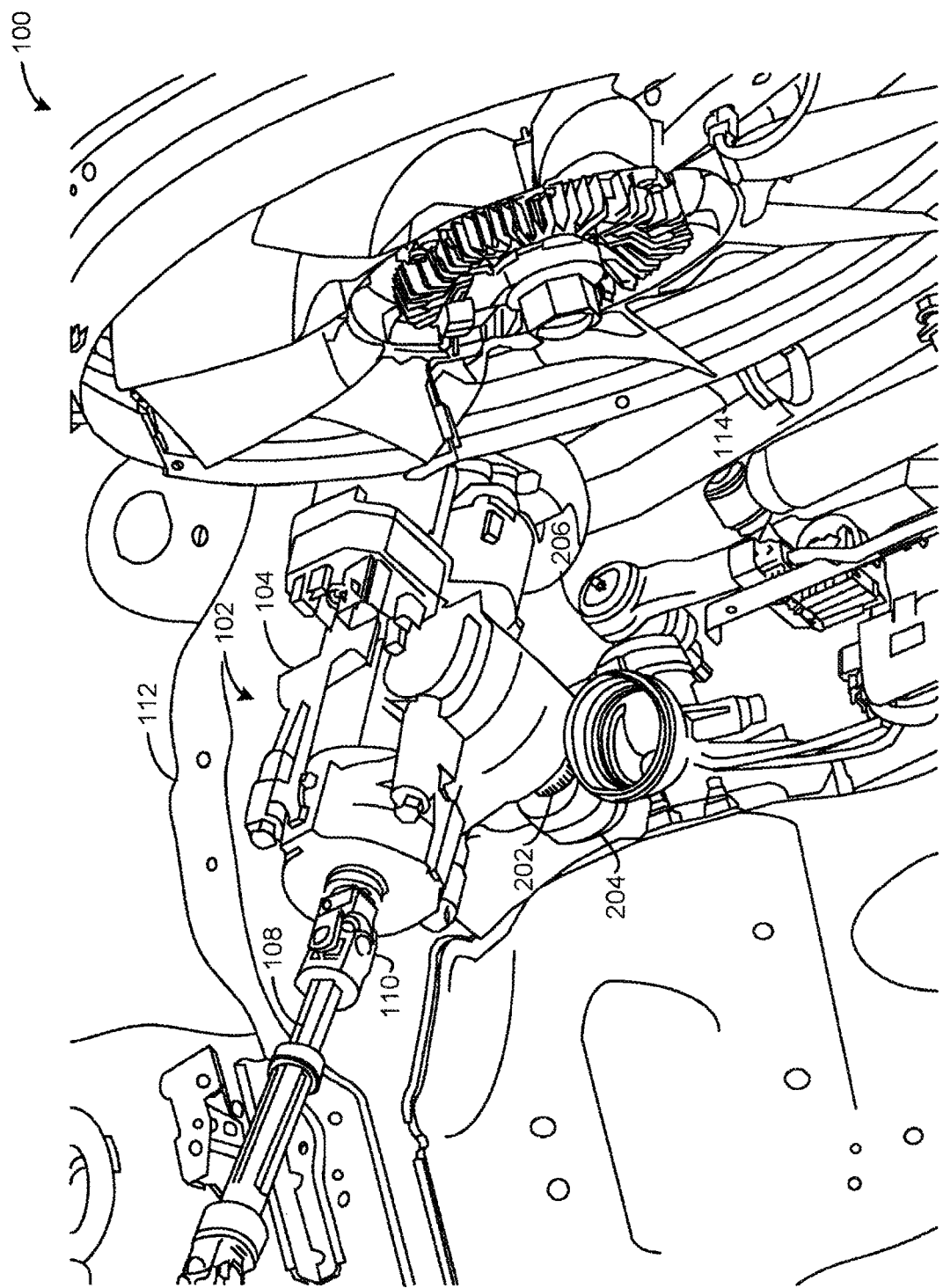
FIG. 2 illustrates a second view of the steering system in the under-hood environment of the vehicle of FIG. 1.

FIG. 2 illustrates a second view of the steering system 102 in the under-hood environment of the vehicle of FIG. 1. In FIG. 2, the engine 118 of FIG. 1 is not shown to more clearly illustrate a splined shaft 202, a pitman arm 204, and a drag link 206 of the steering system 102. In FIG. 2, the splined shaft 202 extends from a sector gear within the housing 104. In FIG. 2, the splined shaft 202 protrudes from a bottom portion of the housing 104 to couple to the pitman arm 204. In some examples, an opening of the pitman arm 204 includes splines that mate with splines of the splined shaft 202. Further, the pitman arm 204 is coupled to the drag link 206, which is connected to a wheel of the vehicle.

In FIG. 2, the steering system 102 causes the splined shaft 202 to rotate in response to a rotation of the steering shaft 108. In turn, the splined shaft 202 moves (e.g., pivots) the pitman arm 204. Further, the pitman arm 204 converts the rotation of the splined shaft 202 into a linear movement of the drag link 206. In some examples, the drag link 206 is connected to a knuckle of a wheel of the vehicle. In some such examples, the linear movement of the drag link 206 adjusts an orientation of the knuckle to turn the wheels. As a result, the steering system 102 converts the rotation of the steering shaft 108 into a movement of the wheels to steer the vehicle.

In some examples, an ample amount of force must be generated to turn the wheels of heavier vehicles, such as trucks. As such, the steering system 102 provides a combined gear reduction of greater than 100:1 to generate the ample amount of force required to steer trucks while utilizing electrically powered steering.

Figure 3:
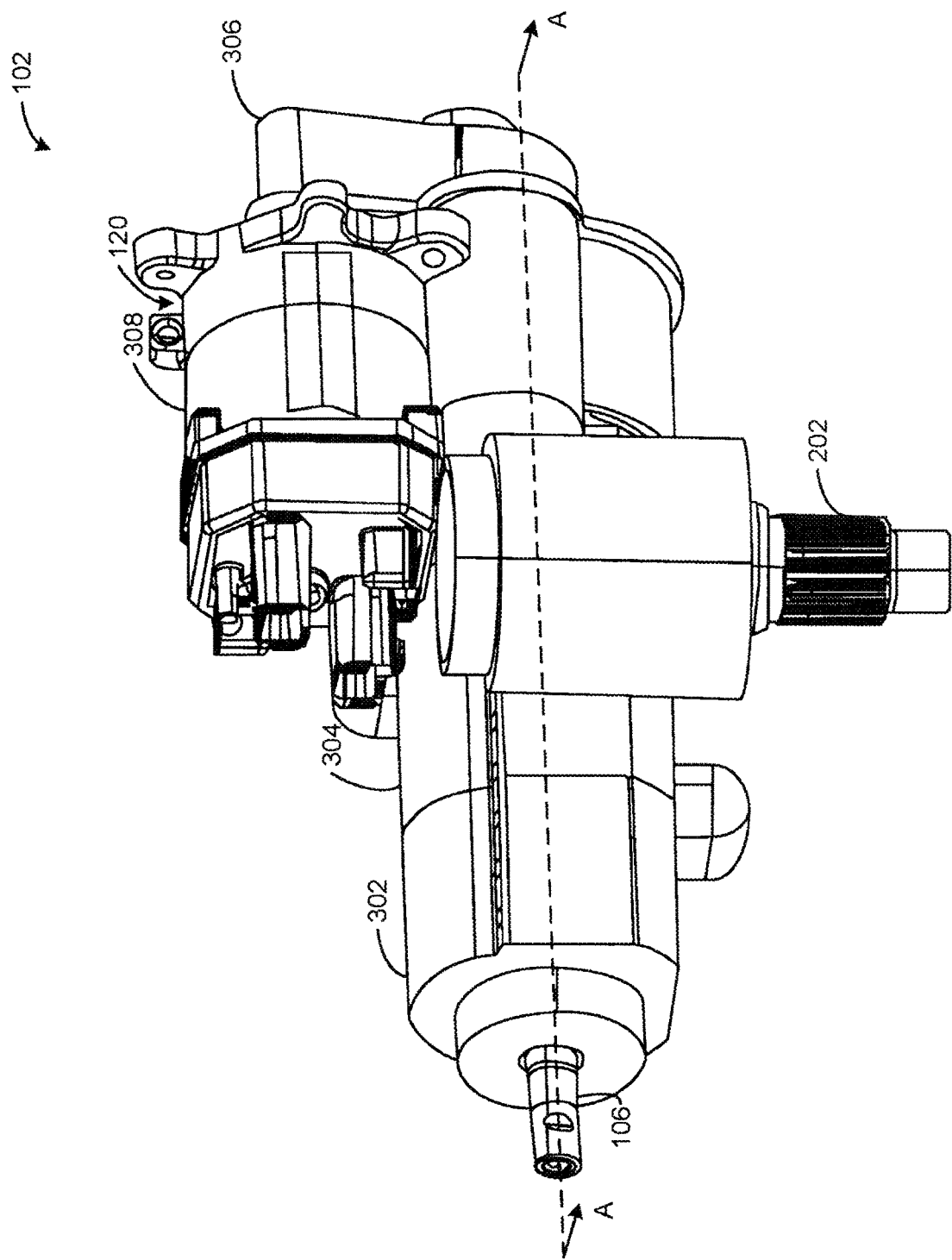
FIG. 3 illustrates the steering system of FIGS. 1 and/or 2.

FIG. 3 illustrates the steering actuator 102 of FIGS. 1 and/or 2. In FIG. 3, the housing 104 of the steering actuator 102 includes a first housing 302, a second housing 304, a third housing 306, and a motor housing 308 associated with the motor 120. In FIG. 3, the motor 120 is disposed in the motor housing 308 with a shaft of the motor 120 extending into the third housing 306. In FIG. 3, the input shaft 106, a first portion of a worm gear, a bearing associated with the worm gear, and a torque sensor are disposed in the first housing 302. In FIG. 3, a second portion of the worm gear, a ball nut, a helical spur gear, a pinion associated with a first pulley wheel, a sector gear, and the splined shaft 202 are disposed in the second housing 304. In FIG. 3, the first pulley wheel, a belt, and a shaft of the motor 120 (e.g., a second pulley wheel) are disposed in the third housing 306.

In FIG. 3, the first housing 302 is coupled to the second housing 304. Further the second housing 304 is coupled to the third housing 306. In some examples, the motor housing 308 is coupled to the third housing 306. In some examples, the input shaft 106 protrudes from a front portion of the first housing 302. In some examples, the splined shaft 202 protrudes from a bottom portion of the second housing 304. In some examples, a torque sensor surrounds a portion of the input shaft 106 within the first housing 302. In some examples, the torque sensor measures an angular rotation of the input shaft 106 relative to the worm gear based on a magnetic field of a magnet mounted on the input shaft 106, as discussed further in association with FIGS. 4 and 5.

Figure 4:
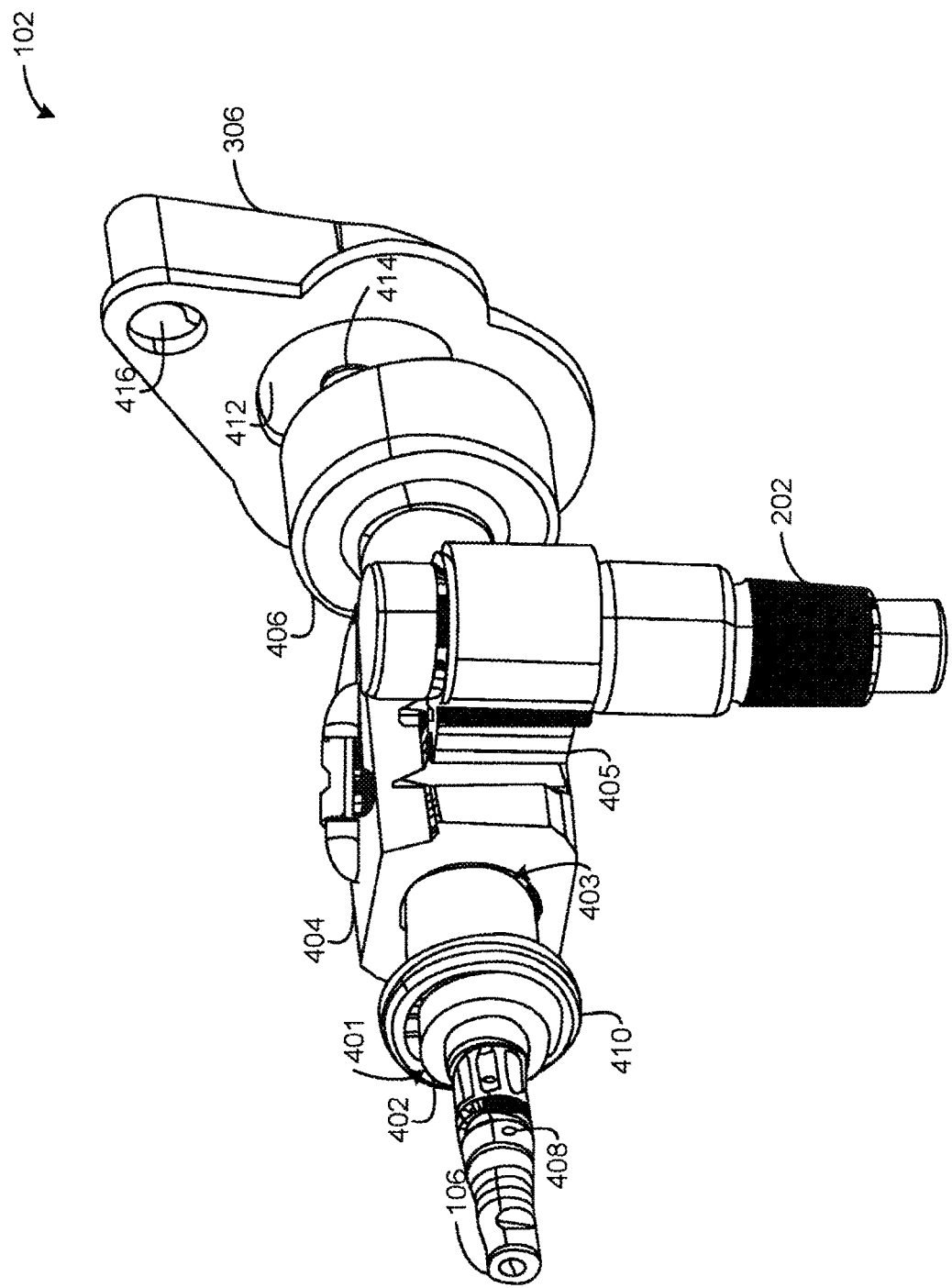
FIG. 4 illustrates a first implementation of the steering system of FIGS. 1, 2, and/or 3 with a portion of the housing removed.

FIG. 4 illustrates a first implementation of the steering system 102 of FIGS. 1, 2, and/or 3 with the first housing 302, the second housing 304, and the motor housing 308 removed. In some examples, the steering system 102 includes the input shaft 106, a first portion 401 of a worm gear 402, a magnet 408 mounted on the input shaft 106, and a bearing (e.g., a bearing and an associated lock ring) 410 positioned within the first housing 302. In some examples, the steering system 102 further includes the splined shaft 202, a second portion 403 of the worm gear 402, a ball nut 404, a sector gear 405, and a helical spur gear 406 positioned in the second housing 304. In FIG. 4, the steering system 102 further includes a pulley wheel (e.g., a first pulley wheel) 412 positioned within the third housing 306 and a pinion 414 of the pulley wheel 412 extending from the third housing 306 into the second housing 304. In some examples, the pinion 414 of the pulley wheel 412 is positioned in the third housing 306 with the pulley wheel 412, as discussed further in association with FIG. 7. In FIG. 4, the motor 120, the shaft associated with the motor 120 (e.g., the second pulley wheel), the belt positioned within the third housing 306, and a torque sensor disposed around a portion of the input shaft 106 are not shown. In some examples, the shaft associated with the motor 120 extends through an opening 416 of the third housing 306.

In FIG. 4, a portion of the input shaft 106 is positioned within the first portion 401 of the worm gear 402. In other examples, the first portion 401 of the worm gear 402 is positioned within the input shaft 106. In some examples, the portion of the input shaft 106 positioned within the first portion 401 of the worm gear 402 includes external gear teeth. In some such examples, the first portion 401 of the worm gear 402 includes internal gear teeth that mesh with the external gear teeth of the input shaft 106 to couple the worm gear 402 and the input shaft 106. Further, a first end of a torsion bar (not shown) is coupled to an interior of the input shaft 106 and a second end of the torsion bar is coupled to an interior of the worm gear 402, as discussed further in association with FIG. 5. As such, the input shaft 106 is also coupled to the worm gear 402 via the torsion bar. In some examples, the internal gear teeth of the worm gear 402 provide to a hard stop at a certain angular rotation of the input shaft 106 to limit a torque applied to the torsion bar. In some such examples, the input shaft 106 and the worm gear 402 rotate together when the hard stop is reached. As such, the hard stop maintains safe operation of the steering system 102 while allowing the torsion bar to hold enough torsion for precise and accurate measurements to be made by the torque sensor.

In FIG. 4, the bearing 410 is disposed around the first portion 401 of the worm gear 402 to provide support to the worm gear 402 and, in turn, the ball nut 404 and the helical spur gear 406 within the first housing 302. In some examples, the ball nut 404 surrounds the second portion 403 of the worm gear 402. In FIG. 4, the helical spur gear 406 is fixed to an end of the worm gear 402 opposite the input shaft 106. As such, the helical spur gear 406 and the worm gear 402 rotate together. In FIG. 4, the pinion 414 of the pulley wheel 412 is engaged with an internal surface of the helical spur gear 406. In some examples, the pinion 414 of the pulley wheel 412 is fixed to the pulley wheel 412 enabling the pulley wheel 412 and the pinion 414 of the pulley wheel 412 to rotate together. In some examples, the belt is engaged with the pulley wheel 412 and the shaft of the motor 120.

In FIG. 4, the torque sensor determines a torque applied by the input shaft 106 to the torsion bar based on an angular rotation of the magnet 408 mounted on the input shaft 106. In other examples, the input shaft 106 is magnetized in place of the magnet 408. Further, an output of the motor 120 is based on the torque applied by the input shaft 106 to the torsion bar and, thus, the angular rotation of the magnet 408. As such, the shaft of the motor 120 drives a rotation of the belt, which rotates the pulley wheel 412 and the pinion 414 of the pulley wheel 412 based on the torque applied by the input shaft 106 to the torsion bar and/or the angular rotation of the magnet 408. As a result, the pinion 414 of the pulley wheel 412 rotates the helical spur gear 406 and, thus, the worm gear 402. In FIG. 4, the ball nut 404 translates as the worm gear 402 rotates. For example, the ball nut 404 moves towards the helical spur gear 406 as the worm gear 402 rotates clockwise in the orientation of FIG. 4 and moves towards the input shaft 106 as the worm gear 402 rotates counterclockwise. In some examples, the sector gear 405 rotates as the ball nut 404 translates. As a result, the rotation of the sector gear 405 rotates the splined shaft 202, which pivots the pitman arm 204 and moves the drag link 206 causing the wheels of the vehicle to pivot.

Figure 5:
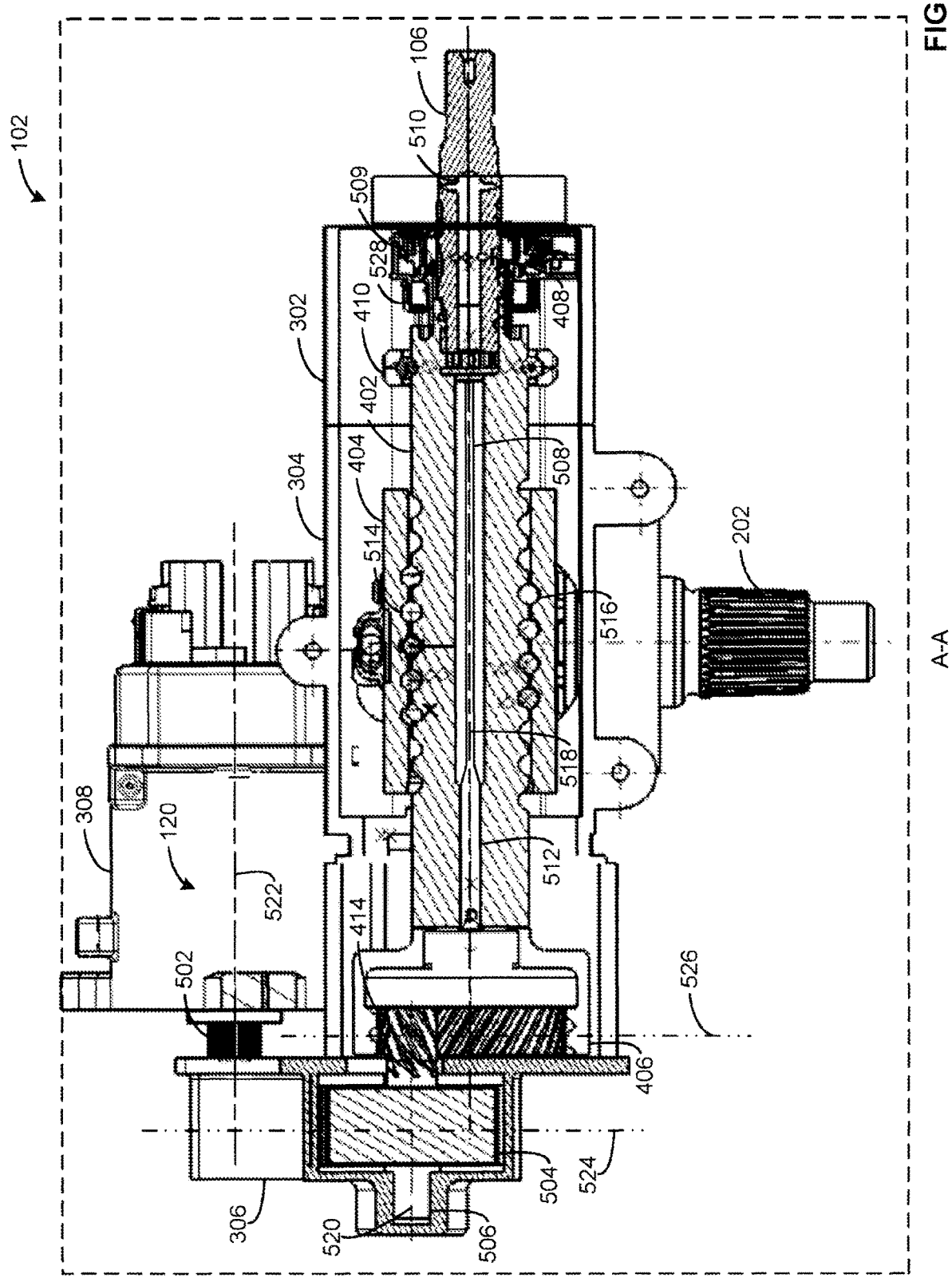
FIG. 5 illustrates a cross-section of the first implementation of the steering system of FIGS. 1, 2, 3, and/or 4.

FIG. 5 illustrates a cross-section A-A (FIG. 3) of the steering system 102 of FIGS. 1, 2, 3, and/or 4. In FIG. 5, the steering system 102 includes a shaft 502 of the motor 120, also referred to as a second pulley wheel 502, a belt 504, a bearing (e.g., a second bearing) 506 of the first pulley wheel 412, a torsion bar 508, and a torque sensor 509. In FIG. 5, the torsion bar 508 includes a first end 510 and a second end 512. In FIG. 5, the steering system further includes the input shaft 106, the splined shaft 202, the first housing 302, the second housing 304, the third housing 306, the motor housing 308, the worm gear 402, the ball nut 404, the helical spur gear 406, the magnet 408, the first bearing 410, and the pinion 414 of the pulley wheel 412. In FIG. 5, the ball nut 404 includes ball guides 514 and ball bearings 516. In FIG. 5, the sector gear 405 of FIG. 4 is positioned behind the worm gear 402 and the ball nut 404.

In FIG. 5, a portion of the third housing 306 is removed to show the belt 504 and the bearing 506 of the first pulley wheel 412. In FIG. 5, the first pulley wheel 412 is positioned behind the belt 504 in the third housing 306. In FIG. 5, the bearing 506 of the first pulley wheel 412 couples the first pulley wheel 412 to the third housing 306. For example, the bearing 506 of the first pulley wheel 412 can be implemented as a dual-row bearing (e.g., a double row angular contact ball bearing) that rotatably couples the first pulley wheel 412 to the third housing 306.

In FIG. 5, the input shaft 106, the worm gear 402, and the helical spur gear 406 are aligned along a first axis of rotation 518. In FIG. 5, the first pulley wheel 412 and the pinion 414 of the pulley wheel 412 are positioned along a second axis of rotation 520. In FIG. 5, the motor 120 and the second pulley wheel 502 are aligned along a third axis of rotation 522. In FIG. 5, the first pulley wheel 412, the second pulley wheel 502, and the belt 504 are aligned along a first plane 524. In FIG. 5, the first plane 524 does not intersect the worm gear 402. In FIG. 5, the pinion 414 of the first pulley wheel 412 and the helical spur gear 406 are aligned along a second plane 526.

In FIG. 5, the placements of the second axis of rotation 520 and the third axis of rotation 522 are orbital relative to the first axis of rotation 518. In other words, the motor 120, the second pulley wheel 502, the belt 504, the first pulley wheel 412, and the pinion 414 can be placed anywhere within a 360° orbit around the worm gear 402 and/or the helical spur gear 406 given that the pinion 414 is engaged with the helical spur gear 406. In the illustrated example of FIG. 5, the pinion 414 is engaged with an internal surface of the helical spur gear 406. In some other examples, the pinion 414 is engaged with an external surface of the helical spur gear 406, as discussed further in association with FIG. 7.

In FIG. 5, the first end 510 of the torsion bar 508 is coupled to an interior of the input shaft 106. In FIG. 5, the second end 512 of the torsion bar 508 is coupled to an interior of the worm gear 402. In FIG. 5, the torque sensor 509 measures an angular rotation of the magnet 408 mounted on the input shaft 106. For example, a Hall effect sensor within the torque sensor 509 can measure a magnetic field and/or a change in the magnetic field of the magnet 408, which alters as the magnet 408 rotates. In some examples, the torque sensor 509 measures an angular rotation of the first end 510 of the torsion bar 508 relative to the second end 512 of the torsion bar 508. In such examples, the Hall effect sensor measures a magnetic field of the torsion bar 508, which alters as the first or second end 510, 512 of the torsion bar 508 rotates. In some examples, the torque sensor 509 utilizes the Vernier algorithm to determine the angular rotation of the input shaft 106 based on the magnetic field of the magnet 408 and/or the torsion bar 508. Further, the torque sensor 509 converts the determined angular rotation to a torque applied by the input shaft 106 to the torsion bar 508.

In some examples, an output of the motor 120 is based on the torque applied by the input shaft 106 to the torsion bar 508 and/or the angular rotation the magnet 408. As a result, the motor 120 drives a rotation of the second pulley wheel 502. In some examples, the second pulley wheel 502 rotates the belt 504 and, in turn, the first pulley wheel 412. In such examples, the pinion 414 rotates with the first pulley wheel 412, which causes the helical spur gear 406 to rotate. Accordingly, the worm gear 402 rotates with the helical spur gear 406, which causes the ball bearings 516 to move through the ball guides 514. In FIG. 5, the ball nut 404 translates as the ball bearings 516 move through the ball guides. As a result, the splined shaft 202 rotates with the sector gear 405 to turn the wheels of the vehicle.

In some examples, a gear 528 associated with the torque sensor 509 rotates with the worm gear 402 allowing the torque sensor 509 to provide an indication to the motor when a target torque is reached. For example, the torque applied by the input shaft 106 to the torsion bar 508 and/or an angular rotation of the magnet 408 determined by the torque sensor 509 can correspond to a target angular rotation of the worm gear 402. As a result, the motor 120 rotates the worm gear 402 and, in turn, the gear 528 associated with the torque sensor 509 via the second pulley wheel 502, the belt 504, the first pulley wheel 412, the pinion 414, and the helical spur gear 406. Further, the torque sensor 509 can compare the rotation of the gear 528 to the target angular rotation of the worm gear 402 to determine when the target rotation is reached.

Figure 6:
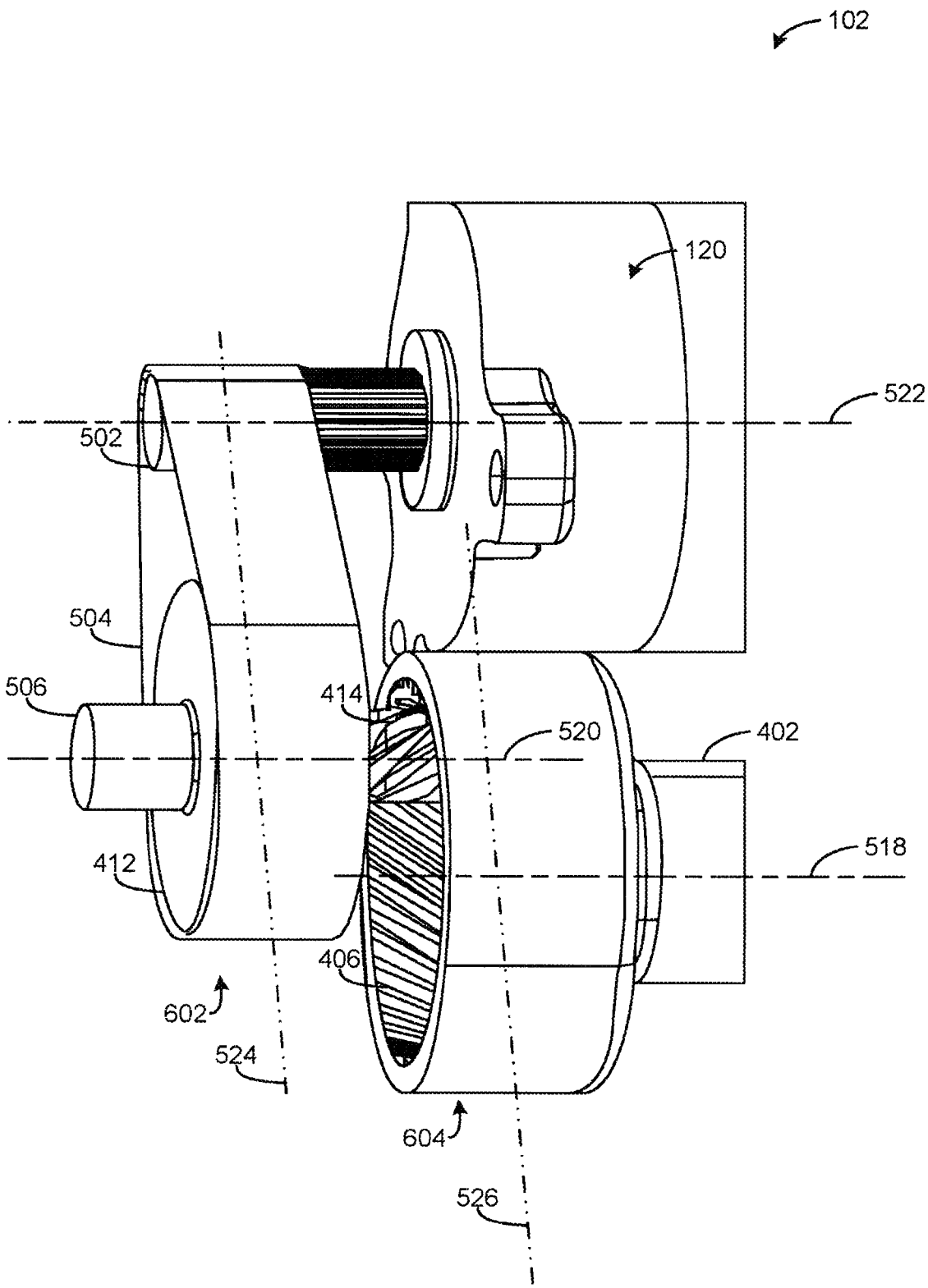
FIG. 6 illustrates a belt engagement of the first implementation of the steering system of FIGS. 1, 2, 3, 4, and/or 5.

FIG. 6 illustrates a belt engagement of the first implementation of the steering system 102 of FIGS. 1, 2, 3, and/or 4. In FIG. 6, the steering system 102 includes a pulley set 602 aligned along the first plane of rotation 524 and a first gear set 604 aligned along the second plane of rotation 526. In FIG. 6, the pulley set 602 includes the first pulley wheel 412, the second pulley wheel 502, and the belt 504. In FIG. 6, the first gear set 604 includes the helical spur gear 406 and the pinion 414 of the first pulley wheel 412. In FIG. 6, the steering system 102 further includes the motor 120, the worm 402, and the bearing 506 of the first pulley wheel 412.

In FIG. 6, the worm 402 and the helical spur gear 406 are aligned along the first axis of rotation 518. In FIG. 6, the first plane of rotation 524 and the second plane of rotation 526 are orthogonal to an axis of rotation of the worm gear 402 (e.g., the first axis of rotation 518). In FIG. 6, the first pulley wheel 412, the pinion 414 of the first pulley wheel 412, and the bearing 506 of the first pulley wheel 412 are aligned along the second axis of rotation 520. In FIG. 6, the motor 120 and the second pulley wheel 502 are aligned along the third axis of rotation 522.

In FIG. 6, the pinion 414 of the first pulley wheel 412 is engaged with an internal surface of the helical spur gear 406. As such, the first gear set 604 includes an internal engagement. In some examples, the first gear set 604 includes an external engagement, as discussed further in association with FIG. 7.

In FIG. 6, the motor 120 rotates the second pulley wheel 502 in response to the torque sensor 509 detecting a torque between the input shaft 106 and the worm gear 402. As such, the second pulley wheel 502 rotates the belt 504, which rotates the first pulley wheel 412, the pinion 414 of the first pulley wheel 412, and the bearing 506 of the first pulley wheel 412. As a result, the pinion 414 of the pulley wheel 412 rotates the helical spur gear 406 and, in turn, the worm gear 402. Accordingly, the rotation of the worm gear 402 causes the ball nut 404 to translate, which rotates the sector gear 405. Further, the splined shaft 202 rotates with the sector gear 405, which causes the pitman arm 204 to pivot. In turn, the pitman arm 204 translates the drag link 206 to turn the wheels of the vehicle.

Figure 7:
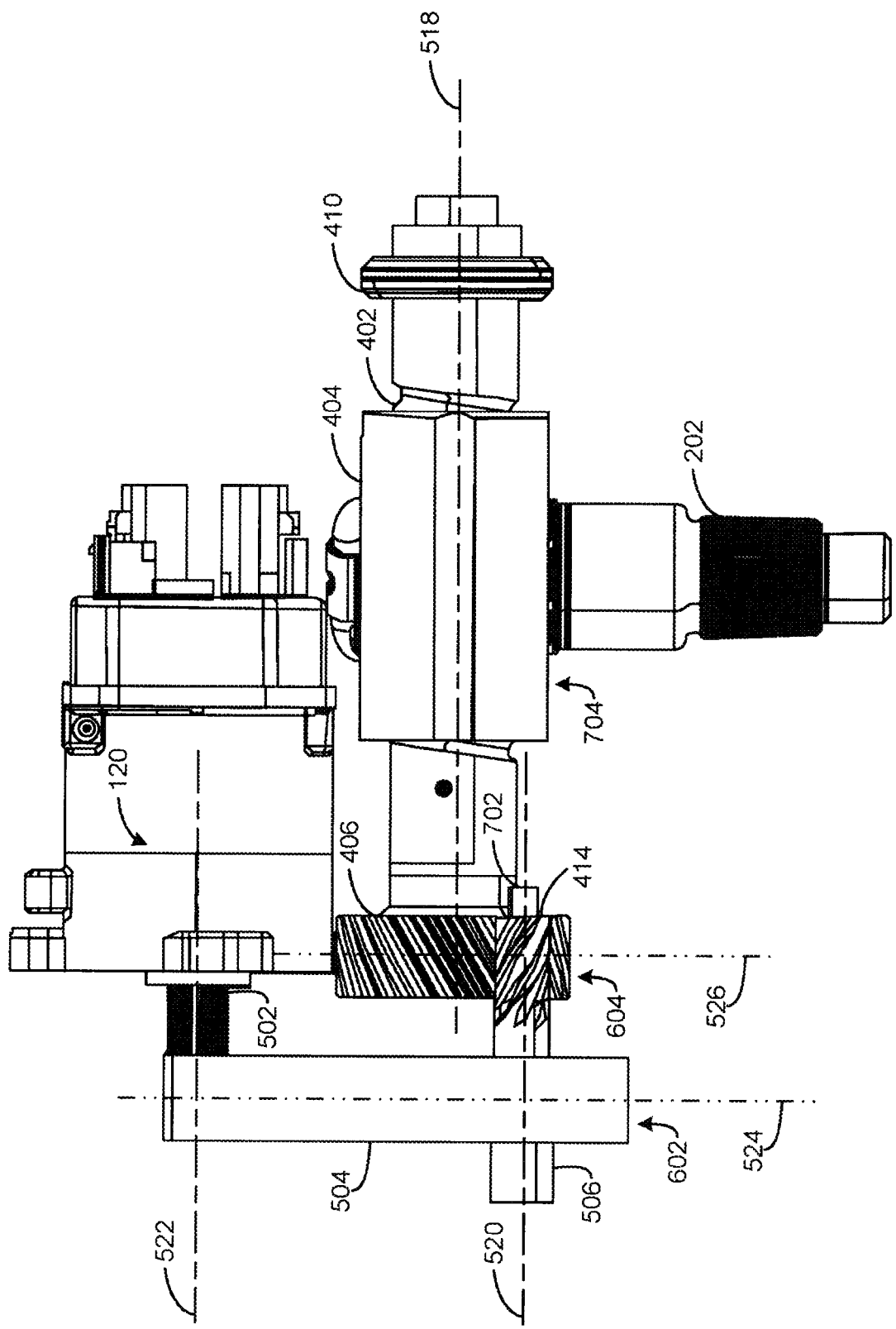
FIG. 7 illustrates a second implementation of the steering system of FIGS. 1, 2, 3, 4, 5, and/or 6.

FIG. 7 illustrates a second implementation of the steering system 102 of FIGS. 1, 2, and/or 3. In FIG. 7, the steering system 102 includes a bearing (e.g., a third bearing) 702 of the pinion 414 of the pulley wheel 412 and a second gear set 704. In FIG. 7, the second gear set 704 includes the worm gear 402 and the ball nut 404. In FIG. 7, the steering system 102 further includes the motor 120, the splined shaft 202, the helical spur gear 406, the first bearing 410, the second pulley wheel 502, the belt 504, the second bearing 506, the first axis of rotation 518, the second axis of rotation 520, the third axis of rotation 522, the plane of rotation 524 of the pulley set 602, and the plane of rotation 526 of the first gear set 604. In FIG. 7, the first pulley wheel 412 is positioned behind the belt 504 and the sector gear 405 is positioned behind the ball nut 404.

In FIG. 7, the pinion 414 of the pulley wheel 412 is engaged with an external surface of the helical spur gear 406. In some examples, the third bearing 702 is coupled to the third housing 306 with the second bearing 506 to support the pinion 414 of the pulley wheel 412. For example, the third bearing 702 can include a double row bearing fixed to the third housing 306. In addition, the second bearing 506 can include a double row bearing fixed to an opposite side of the third housing 306 from the third bearing 702. As a result, the second bearing 506 and the third bearing 702 couple the pulley wheel 412 and the pinion 414 of the pulley wheel 412 to the third housing 306.

In FIG. 7, the positions of the second axis of rotation 520 and the third axis of rotation 522 are orbital relative to the first axis of rotation 518 provided that the pinion 414 of the pulley wheel 412 is engaged with the helical spur gear 406 and the first and second pulley wheels 412, 502 are engaged with the belt 504. As a result, the steering system 102 includes a flexible arrangement that can be modified to fit in an under-hood environment of a vehicle (e.g., the under-hood environment 100). In FIG. 7, the first plane of rotation 524 and the second plane of rotation 526 are orthogonal to the first axis of rotation 518, the second axis of rotation 520, and/or the third axis of rotation 522. In FIG. 7, the first plane of rotation 524 does not intersect the worm gear 402.

In FIG. 7, the motor 120 drives the second pulley wheel 502 based on a rotation of the input shaft 106. In FIG. 7, the second pulley wheel 502 rotates the belt 504, which causes the first pulley wheel 412 to rotate. As such, the pinion 414 of the first pulley wheel 412 rotates, which rotates the helical spur gear 406 and, thus, the worm gear 402. In turn, the rotation of the worm gear 402 translates the ball nut 404 which rotates the sector gear 405 and the splined shaft 202 to turn the wheels of the vehicle.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide a belt driven rotary assist apparatus for RCB steering gears. As a result, the RCB steering gears are able to generate sufficient steering power for heavier vehicles, such as trucks, while utilizing electrical power steering. In addition, the belt driven rotary assist apparatus provides a versatile layout that is advantageous for implementation within different under-hood environments. Specifically, a placement of the second axis of rotation 520, along which the first pulley wheel 412 and the pinion 414 of the first pulley wheel 412 are aligned, and the third axis of rotation 522, along which the motor 120 and the second pulley wheel 502 are aligned, is orbital to the first axis of rotation 518, along which the worm gear 402 and the helical spur gear 406 are aligned.

Example belt driven rotary assist apparatus for recirculating ball steering gears are disclosed herein. Further examples and combinations thereof include the following:

Example 1 includes a motor vehicle steering system comprising an input shaft to couple to a steering shaft of a motor vehicle, a worm gear, a first end of the worm gear coupled to the input shaft, a second end of the worm gear fixed to a helical spur gear, a ball nut surrounding a portion of the worm gear, the ball nut including ball bearings and ball guides, a first pulley wheel fixed to a pinion, the first pulley wheel engaged with a belt, the pinion engaged with the helical spur gear, a motor fixed to a second pulley wheel, the second pulley wheel engaged with the belt, the motor to rotate the worm gear to translate the ball nut, and a sector gear engaged with the ball nut, the sector gear to rotate as the ball nut translates.

Example 2 includes the motor vehicle steering system of example 1, wherein the second pulley wheel rotates the belt, the belt rotates the first pulley wheel and the pinion, and the pinion rotates the helical spur gear to rotate the worm gear and translate the ball nut.

Example 3 includes the motor vehicle steering system of example 2, further including a pitman arm coupled to the sector gear, the pitman arm to couple to a drag link to turn wheels of a motor vehicle as the sector gear rotates.

Example 4 includes the motor vehicle steering system of example 1, wherein an engagement of the belt between the first pulley wheel and the second pulley wheel provides a first gear reduction and an engagement between the pinion and the helical spur gear provides a second gear reduction.

Example 5 includes the motor vehicle steering system of example 4, wherein the first gear reduction and the second gear reduction provide a combined reduction of greater than 100:1.

Example 6 includes the motor vehicle steering system of example 1, wherein the pinion is engaged with an internal surface of the helical spur gear.

Example 7 includes the motor vehicle steering system of example 1, further including a torque sensor to measure an angular rotation of the input shaft relative to the worm gear.

Example 8 includes the motor vehicle steering system of example 7, wherein an output of the motor is based on the angular rotation of the input shaft relative to the worm gear.

Example 9 includes a steering actuator comprising a worm gear fixed to a helical spur gear, a pulley set including a belt engaged with a shaft of a motor and a pulley wheel, a first gear set including a pinion of the pulley wheel engaged with the helical spur gear, and a second gear set including a ball nut engaged with a portion of the worm gear, the ball nut to translate as the worm gear rotates.

Example 10 includes the steering actuator of example 9, further including a torsion bar, wherein a first end of the torsion bar is coupled to an interior of the worm gear and a second end of the torsion bar is coupled to an interior of an input shaft.

Example 11 includes the steering actuator of example 10, further including a torque sensor to determine a torque applied by the input shaft to the torsion bar based on an angular rotation of the torsion bar.

Example 12 includes the steering actuator of example 11, wherein an output of the motor is based on the torque applied by the input shaft to the torsion bar.

Example 13 includes the steering actuator of example 9, wherein the pulley set is aligned along a first plane and the first gear set is aligned along a second plane, the first plane and the second plane orthogonal to an axis of rotation of the worm gear.

Example 14 includes the steering actuator of example 13, wherein the first plane does not intersect the worm gear.

Example 15 includes the steering actuator of example 9 further including a sector gear engaged with the ball nut, the sector gear to rotate as the ball nut translates.

Example 16 includes the steering actuator of example 9, wherein the pinion of the pulley wheel is engaged with an internal surface of the helical spur gear.

Example 17 includes the steering actuator of example 9, wherein the pinion of the pulley wheel is engaged with external gear teeth of the helical spur gear.

Example 18 includes a steering apparatus comprising a worm gear fixed to a helical spur gear, the worm gear and the helical spur gear aligned along a first axis of rotation, a belt engaged with a pulley wheel, the pulley wheel fixed to a pinion, the pulley wheel and the pinion aligned along a second axis of rotation parallel to the first axis of rotation, the pinion engaged with the helical spur gear, and a motor fixed to a shaft, the motor and the shaft aligned along a third axis of rotation parallel to the second axis of rotation, the shaft engaged with the belt.

Example 19 includes the steering apparatus of example 18, wherein a placement of the second axis of rotation and the third axis of rotation is orbital relative to the first axis of rotation.

Example 20 includes the steering apparatus of example 18, further including a steering shaft coupled to the worm gear.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle steering system comprising:
   an input shaft to couple to a steering shaft of a vehicle;
   a worm gear, a first end of the worm gear coupled to the input shaft, a second end of the worm gear fixed to and in contact with a spur gear;
   a ball nut surrounding a portion of the worm gear, the ball nut including ball bearings and ball guides;
   a first pulley wheel fixed to a pinion, the first pulley wheel engaged with a belt, the pinion engaged with the spur gear;
   a motor fixed to a second pulley wheel, the second pulley wheel engaged with the belt, the motor to rotate the worm gear to translate the ball nut; and
   a sector gear engaged with the ball nut, the sector gear to rotate as the ball nut translates.

2. The vehicle steering system of claim 1, wherein the second pulley wheel rotates the belt, the belt rotates the first pulley wheel and the pinion, and the pinion rotates the spur gear to rotate the worm gear and translate the ball nut.

3. The vehicle steering system of claim 2, further including a pitman arm coupled to the sector gear, the pitman arm to couple to a drag link to turn wheels of a motor vehicle as the sector gear rotates.

4. The vehicle steering system of claim 1, wherein an engagement of the belt between the first pulley wheel and the second pulley wheel provides a first gear reduction, and wherein an engagement between the pinion and the spur gear provides a second gear reduction to increase a torque provided by the first gear reduction.

5. The vehicle steering system of claim 4, wherein the first gear reduction and the second gear reduction provide a combined reduction of greater than 100:1.

6. The vehicle steering system of claim 1, wherein the pinion is engaged with an internal surface of the spur gear.

7. The vehicle steering system of claim 1, further including a torque sensor to measure an angular rotation of the input shaft relative to the worm gear.

8. The vehicle steering system of claim 7, wherein an output of the motor is based on the angular rotation of the input shaft relative to the worm gear.

9. The vehicle steering system of claim 1, wherein the worm gear and the spur gear are aligned along a first rotational axis, and wherein the first pulley wheel and the pinion are aligned along a second rotational axis different from the first rotational axis.

10. A steering actuator comprising:
a worm gear fixed to a spur gear;
a pulley set including a belt engaged with a shaft of a motor and a pulley wheel;
a first gear set including a pinion of the pulley wheel engaged with an internal surface of the spur gear; and
a second gear set including a ball nut engaged with a portion of the worm gear, the ball nut to translate as the worm gear rotates.

11. The steering actuator of claim 10, further including a torsion bar, wherein a first end of the torsion bar is coupled to an interior of the worm gear and a second end of the torsion bar is coupled to an interior of an input shaft.

12. The steering actuator of claim 11, further including a torque sensor to determine a torque applied by the input shaft to the torsion bar based on an angular rotation of the torsion bar.

13. The steering actuator of claim 12, wherein an output of the motor is based on the torque applied by the input shaft to the torsion bar.

14. The steering actuator of claim 10, wherein the pulley set is aligned along a first plane and the first gear set is aligned along a second plane, the first plane and the second plane orthogonal to an axis of rotation of the worm gear.

15. The steering actuator of claim 14, wherein the first plane does not intersect the worm gear.

16. The steering actuator of claim 10 further including a sector gear engaged with the ball nut, the sector gear to rotate as the ball nut translates.

17. The steering actuator of claim 10, wherein the pinion of the pulley wheel is engaged with external gear teeth of the spur gear.

18. A steering apparatus comprising:
a worm gear fixed to a spur gear, the worm gear and the spur gear aligned along a first axis of rotation;
a belt engaged with a pulley wheel, the pulley wheel fixed to a pinion, the pulley wheel and the pinion aligned along a second axis of rotation parallel to the first axis of rotation, the second axis of rotation different from the first axis of rotation, the pinion engaged with the spur gear; and
a motor fixed to a shaft, the motor and the shaft aligned along a third axis of rotation parallel to the second axis of rotation, the shaft engaged with the belt.

19. The steering apparatus of claim 18, wherein a placement of the second axis of rotation and the third axis of rotation is able to be positioned anywhere along a 360° orbit of the first axis of rotation.

20. The steering apparatus of claim 18, further including a steering shaft coupled to the worm gear.

* * * * *